(12) United States Patent
Gram

(10) Patent No.: US 11,319,145 B2
(45) Date of Patent: May 3, 2022

(54) CARGO TRANSPORTATION CONTAINER AND METHOD OF ASSEMBLING THE SAME

(71) Applicant: Maersk Container Industry A/S, Tinglev (DK)

(72) Inventor: Tonny Gram, Rodekro (DK)

(73) Assignee: Maersk Container Industry A/S, Tinglev (DK)

( * ) Notice: Subject to any disclaimer, the term of this patent is extended or adjusted under 35 U.S.C. 154(b) by 241 days.

(21) Appl. No.: 15/322,054

(22) PCT Filed: Jun. 24, 2015

(86) PCT No.: PCT/EP2015/064237
§ 371 (c)(1),
(2) Date: Dec. 23, 2016

(87) PCT Pub. No.: WO2015/197681
PCT Pub. Date: Dec. 30, 2015

(65) Prior Publication Data
US 2017/0137216 A1    May 18, 2017

(30) Foreign Application Priority Data
Jun. 25, 2014   (DK) .......................... PA 2014 00334

(51) Int. Cl.
*B65D 90/08*    (2006.01)
*C09J 5/06*     (2006.01)
(Continued)

(52) U.S. Cl.
CPC .............. *B65D 90/08* (2013.01); *B29C 65/02* (2013.01); *B29C 65/4805* (2013.01);
(Continued)

(58) Field of Classification Search
CPC .. B65D 90/08; B65D 88/12; C09J 5/06; C09J 123/12; C09J 2201/61; C09J 2400/163;
(Continued)

(56) References Cited

U.S. PATENT DOCUMENTS 3,996,402 A * 12/1976 Sindt ................... B29C 65/4815
                                                       428/140
5,198,053 A *  3/1993 Duncan ................... B29C 65/44
                                                       156/272.4
(Continued)

FOREIGN PATENT DOCUMENTS

CN          101429413 A  *  5/2009
CN          101429413 a      5/2009
(Continued)

OTHER PUBLICATIONS

International Search Report and Written Opinion for PCT/EP2015/064237, dated Sep. 2, 2015.
(Continued)

*Primary Examiner* — Ernesto A Grano
(74) *Attorney, Agent, or Firm* — EIP US LLP

(57) ABSTRACT

A cargo transportation container (1) where the inside of the container (1) is lined with plates (7, 9, 10), typical the side walls (2) are lined with metal plates (9) and the ceiling (6) is lined with plates (7) made of a polymer based material. The metal plates (9) and the plates (7) of polymer based material are joined together by a connecting plate (10). The connecting plates (10) typically are made of a polymer based material but can also be made of metal. An intermediate layer (13) is used to join the metal plates (9) and the plates (7, 10) of polymer based material.

20 Claims, 3 Drawing Sheets

(51) Int. Cl.
*B29C 65/02* (2006.01)
*B29C 65/48* (2006.01)
*B29C 65/78* (2006.01)
*B65D 88/12* (2006.01)
*C09J 123/12* (2006.01)
*B29L 31/00* (2006.01)

(52) U.S. Cl.
CPC .............. *B29C 65/78* (2013.01); *B65D 88/12* (2013.01); *C09J 5/06* (2013.01); *C09J 123/12* (2013.01); *B29L 2031/712* (2013.01); *C09J 2301/304* (2020.08); *C09J 2400/163* (2013.01); *C09J 2423/10* (2013.01); *C09J 2423/106* (2013.01)

(58) Field of Classification Search
CPC .... C09J 2423/10; C09J 2423/106; C09J 5/10; B29C 65/78; B29C 65/4805; B29C 65/02; B29L 2031/712
USPC .................................. 220/1.5, 562; 206/321
See application file for complete search history.

(56) References Cited

U.S. PATENT DOCUMENTS

| | | | | |
|---|---|---|---|---|
| 5,279,436 A * | 1/1994 | Elliott | ................ | B65D 88/528 206/321 |
| 6,793,271 B1 * | 9/2004 | Deets | ................ | B62D 33/046 105/396 |
| 7,308,857 B2 * | 12/2007 | Moore, Jr. | ......... | B65D 19/0012 108/51.11 |
| 9,708,513 B2 * | 7/2017 | Ackermann | .............. | B32B 5/02 |
| 2008/0196831 A1 | 8/2008 | Friese et al. | | |
| 2011/0247958 A1 * | 10/2011 | Lucas | ...................... | B32B 5/02 206/524.6 |
| 2012/0087760 A1 * | 4/2012 | Sims | .................... | B65D 90/047 410/52 |
| 2015/0037596 A1 * | 2/2015 | Takamori | ............. | C09J 123/142 428/446 |
| 2015/0061474 A1 * | 3/2015 | Ubidia | ...................... | G07F 9/10 312/35 |
| 2018/0057719 A1 * | 3/2018 | Nakashima | .............. | C09J 7/405 |

FOREIGN PATENT DOCUMENTS

| | | | |
|---|---|---|---|
| CN | 202828607 U | * | 3/2013 |
| CN | 202828607 u | | 3/2013 |
| CN | 103264855 a | | 8/2013 |
| DE | 29918601 U1 | | 2/2000 |

OTHER PUBLICATIONS

Preliminary Report on Patentability for PCT/EP2015/064237, completed Sep. 21, 2016.

* cited by examiner

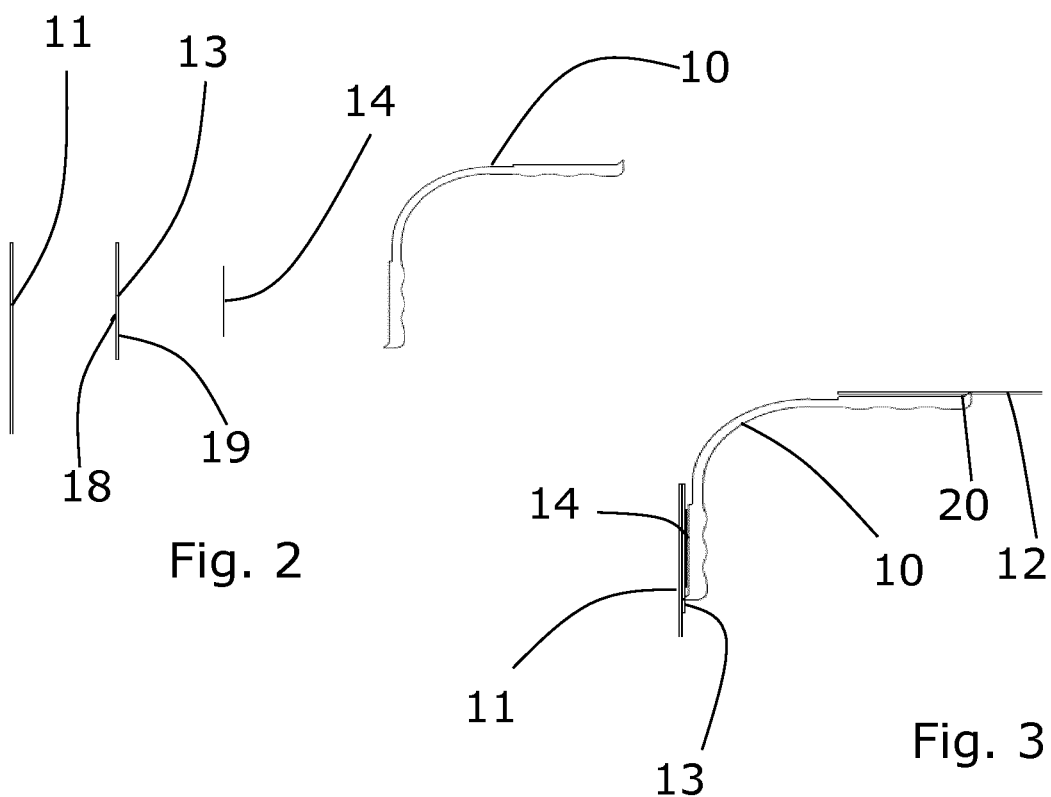

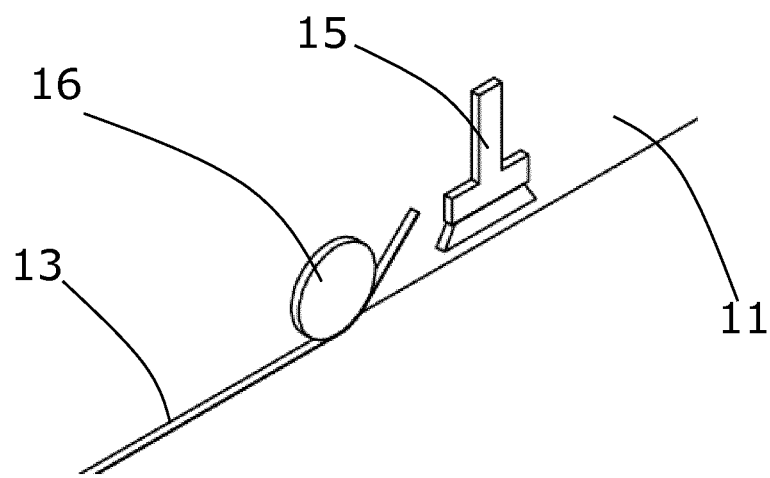
Fig. 5
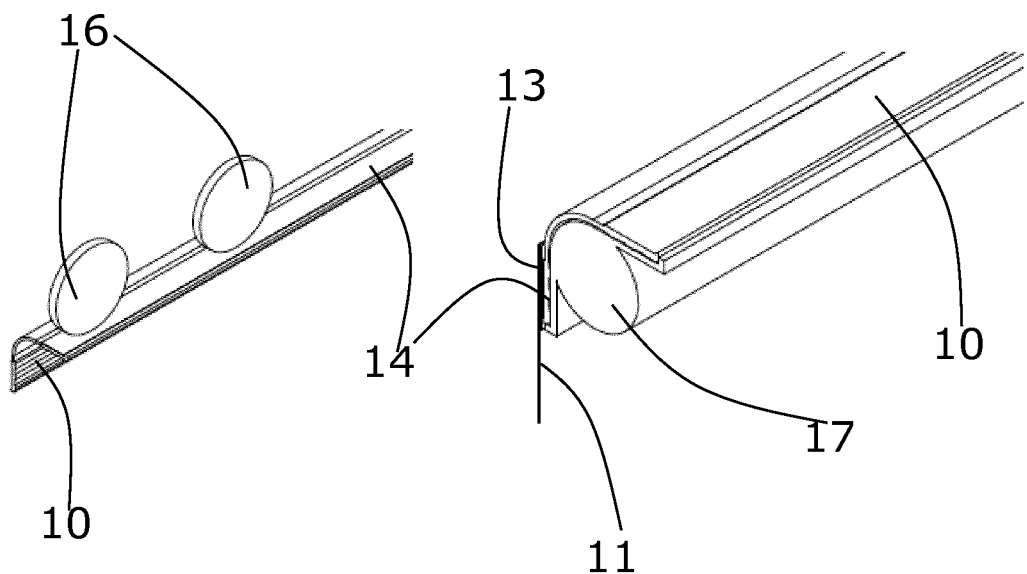
Fig. 6
Fig. 7

CARGO TRANSPORTATION CONTAINER AND METHOD OF ASSEMBLING THE SAME

RELATED APPLICATIONS

This application claims the benefit under 35 U.S.C. § 371 of the filing date of International Patent Application No. PCT/EP2015/064237, having an international filing date of Jun. 24, 2015, which claims priority to Danish Application No. PA 2014 00334, filed Jun. 25, 2014, the contents of both of which are incorporated herein by reference in their entirety.

FIELD OF THE INVENTION

The present invention relates to a cargo transportation container comprising a ceiling and at least two side walls, the ceiling and side walls comprises at least two plates including at least a connecting plate, where at least one of the side walls, the ceiling or the connection plate is made of metal and that an intermediate layer is capable of adhering to metals and plastics when heated.

The invention further relates to a method of assembling a cargo transportation container, the transport container comprises a ceiling and at least two side walls, the ceiling and side walls comprises at least two plates including at least a connecting plate, where at least one of the side walls, the ceiling or the connection plate is made of metal and that an intermediate layer is capable of adhering to metals and plastics when heated.

BACKGROUND OF THE INVENTION

The inside walls and the ceiling of a cargo transportation container are usually lined with plates of either metals like steel or aluminium or plates made of polymer based materials.

It is common knowledge to line the inside of the cargo transportation container with plates of metals like steel or aluminium and joining them by riveting.

However using rivets has the disadvantage that bacteria and dirt can get stuck in the rivets causing hygiene problems because the rivets are difficult to clean. Furthermore another disadvantage by using rivets is that there is a risk the rivets fail when mounted. And also during use of the container there is a risk of damaging the rivets because the rivets protrude beyond the base material.

If steel, preferably stainless steel, is used, joining of steel can also be done by welding, which have sufficient strength and is simple to apply. Other materials can be attached to steel by gluing as stainless steel is fairly easy to glue to.

Thermoplastics are also widely used as materials when manufacturing shipping containers. In containers PVC (polyvinylchloride) and PP (polypropylene) is the most used thermoplastics. Both are easy and cheap in fabrication. Both materials are able to weld to materials of their own kind. Furthermore, PVC is possible to join by gluing whereas PP is more problematic to glue.

Due to the easy cleaning and larger working temperature of PP, it is the preferred plastic in fabrication of cargo transportation containers also called shipping containers. The easy cleaning comes from a low surface tension of the material. But at the same time low surface tension causes that it is very difficult to glue. The low surface tension additionally makes it difficult for dirt and bacteria to stick to it.

Many reefer containers are manufactured having either a stain less steel side inner lining or a reinforced PP lining. To make a connection between the side and the roof there have to be a corner profile. This corner profile usually have been attached with rivets which have some drawbacks under assembly as earlier mentioned, and if the container is damaged.

Maersk Container Industry utility model CN 202828607 U is disclosing a connecting mechanism for the container inner apical angle comprising a top plate and a side plate and a connecting plate. The connecting plate is of an L-shaped plastic material. The connecting plate connects the top plate and the side plate, both made of a thermoplastic material.

Further CN 103264855 A discloses a similar solution where a connecting mechanism for the container inner apical angle comprising a top plate and a side plate and a connecting plate. The connecting plate is of an L-shaped plastic material. The connecting plate connects the top plate and the side plate, both made of a thermoplastic material.

Hereby a connection between the top plate and the side plate being both of a thermoplastic material is established by hot melting an "L" shaped plastic profile to the top plate and the side plate.

SUMMERY OF THE INVENTION

It is the object of the invention to make a cargo transportation container where the inside compartment is lined with plates of metal and plates of polymer based material, or containers with all metal plates. By this invention connections that traditionally are joined with rivets can be joined in a simple effective manner.

This is achieved in a cargo transportation container comprising a ceiling and at least two side walls. A first plate, which can be either a top plate or side plate and be made of either a polymer based material or metal, is joined to a connecting plate which can be either of a polymer based material or metal. The connecting plate can be a part of the ceiling or side walls or be an additional part. When the first plate and connecting plate are from materials that traditionally are joined by riveting, the joining of the two is obtained by an intermediate layer.

The invention is achieved by having that an intermediate layer comprises at one side an adhesive for adhering to a metal plate and at an other side a hot melt material for welding to a plastic material.

The intermediate layer is of a polymer based material that allows for joining. The intermediate layer can adhere to metals and plastics when heated. When joining to metals it is only the intermediate layer that melts effectively creating adhesion, when joining to plastics both materials from the hot melt and from the first plate melt effectively together, creating a weld.

In an embodiment the intermediate layer comprises a polymer based material.

In an embodiment the plastic material is PP (polypropylene).

In an embodiment the polymer based material used for the first plate or the second plate is a thermoplastic elastomer material or a polypropylene thermoplastic.

In an embodiment the metal used for the connecting plate is steel or aluminium.

In an embodiment the connection plate is provided with a welding grid placed between one surface of the intermediate layer and the plate made of polymer based material, the welding grid is connected to electrical power for heating up the hot melt material.

The invention is further achieved by a method of assembling a cargo transportation container, the transport container comprises a ceiling and at least two side walls, the ceiling and side walls comprises at least two plates including at least a connecting plate, where at least one of the side walls, the ceiling or the connection plate is made of metal and that an intermediate layer is capable of adhering to metals and plastics when heated, where the first plate and the second plate of which at least one is made of polymer based material, is connected to the connection plate made of metal by providing an intermediate layer comprising at one side an adhesive for adhering to a metal plate and at an other side a hot melt material for welding to a plastic material.

In an embodiment of the method the connecting plate is made of metal, and one surface of the intermediate layer is fixed to the connecting plate by heating up the metal where the intermediate layer is to be applied and apply the intermediate layer to create an adhesive bonding between the connecting plate made of metal and the one surface of the intermediate layer.

In an embodiment at least the connecting plate is made of metal, and one surface of the intermediate layer is fixed to the connecting plate by heating up first intermediate layer and applying the intermediate layer to the connecting plate to create an adhesive bonding between the connecting plate and the one surface of the intermediate layer.

In an embodiment the first plate and/or the second plate is made of polymer based material, and one surface of the intermediate layer is fixed to the plate made of polymer based material by welding.

In an embodiment a welding grid is placed between one surface of the intermediate layer and the plate made of polymer based material, the plate made of polymer based material is welded to the intermediate layer by connecting electrical power to the welding grid.

In an embodiment pressure is applied to the plate made of polymer based material during and/or after welding where the plate is connected to the intermediate layer.

Further the cargo transportation container can also comprise a second plate. The second plate can be placed in the ceiling or in the side walls and the second plate is also joined to the connecting plate, the second plate is joined either in the same manner as the first plate, or if the second plate is of a joinable material, the second plate can be joined with the connecting plate directly.

In an embodiment the first plate is made of metal and is a part of the side walls and the second plate is made of a polymer based material and is part of the ceiling. The two plates are connected by an L-formed connecting plate.

In one alternative embodiment the connecting plate can be flat connecting for instance two plates of different material both placed in the side wall or in the ceiling.

In a second alternative embodiment the connecting plate is part of the side walls, with a bend allowing for direct connection to the roof via the intermediate layer.

If the connecting plate or the first plate is made of metal, the two plates are joined by an intermediate layer the intermediate layer comprises two surfaces, where one surface is fixed to the connecting plate and the other surface is fixed to the first plate. The intermediate layer will typically be a band that is rolled out on the surface of the first or second plate or the connecting plate.

If the first plate or the connecting plate is made of metal, one surface of the first intermediate layer is adhered to the plate made of metal by heating up the metal where the first intermediate layer is to be applied. Fixing the first intermediate layer to the plate is realised by pressing the two materials together creating adhesion.

If the first or second plate or the connecting plate is made of polymer based material, then one surface of the first or second intermediate layer is fixed to the plate made of polymer based material by welding. The welding is realised by placing a welding grid between one surface of the first or second intermediate layer and the plate made of polymer based material, the plate made of polymer based material is welded to the intermediate layer by connecting electrical power to the welding grid.

The advantage of using the intermediate layer to join the polymer plates and metal plates is that it makes it possible to join plates of different material which until now only have been realistically possible to join by rivets. Other bindings like gluing are possible but require high levels of cleaning not easily achievable in a container production.

The invention makes it therefore possible to have a cargo transportation container comprising a ceiling and at least two side walls, the ceiling and side walls comprises at least two plates including at least a connecting plate, where at least one of the side walls, the ceiling or the connection plate is made of metal and that an intermediate layer is capable of adhering to metals and plastics when heated.

In an embodiment the connecting plate is made of PP (Polypropylene).

With a reinforced PP lining (Polypropylene), the connection between the side lining and the roof can be made with a PP corner profile and welded together by heating up the PP surface of both the corner profile and the PP lining.

In order to gain the benefits from above mentioned process on containers with the side inner lining of stainless steel and roof of PP a special material can be used as an intermediate layer. To the roof the corner connection can be welded as both materials are PP. The special material is a hot melt/glue/plastic material making a glue-like connection to the stainless steel and a welding connection to the PP corner profile. Both processes are triggered by heat and can therefore be made in one working procedure.

In an embodiment the intermediate layer comprises a thermoplastic elastomer material being a TPE-V.

In an embodiment the TPE-V can comprise a further agent providing that the product can react together with the metal grid.

Further advantages are that the use of an intermediate layer lowers direct cost and labour cost. That the joint is homogenous in the whole longitude of the container which distributes forces better and has a more esthetical appearance.

Further embodiments and advantages are disclosed below in the description and in the claims.

BRIEF DESCRIPTION OF THE DRAWINGS

The invention will now be described more fully below, by way of example only, with reference to the accompanying drawings, in which:

FIG. 2 shows an exploded view of the elements used to join the first plate and the connecting plate;

FIG. 3 shows the first plate and second plate joined by a connecting plate;

FIG. 4 shows an alternative embodiment where the connecting plate and the second plate are integrated in one plate;

FIG. 5 shows rolling on the intermediate layer to the first plate;

FIG. 6 shows rolling on the welding grid to the connecting plate; and

FIG. 7 shows joining the first plate and the connecting plate.

DETAILED DESCRIPTION OF THE DRAWINGS

Figure 1:
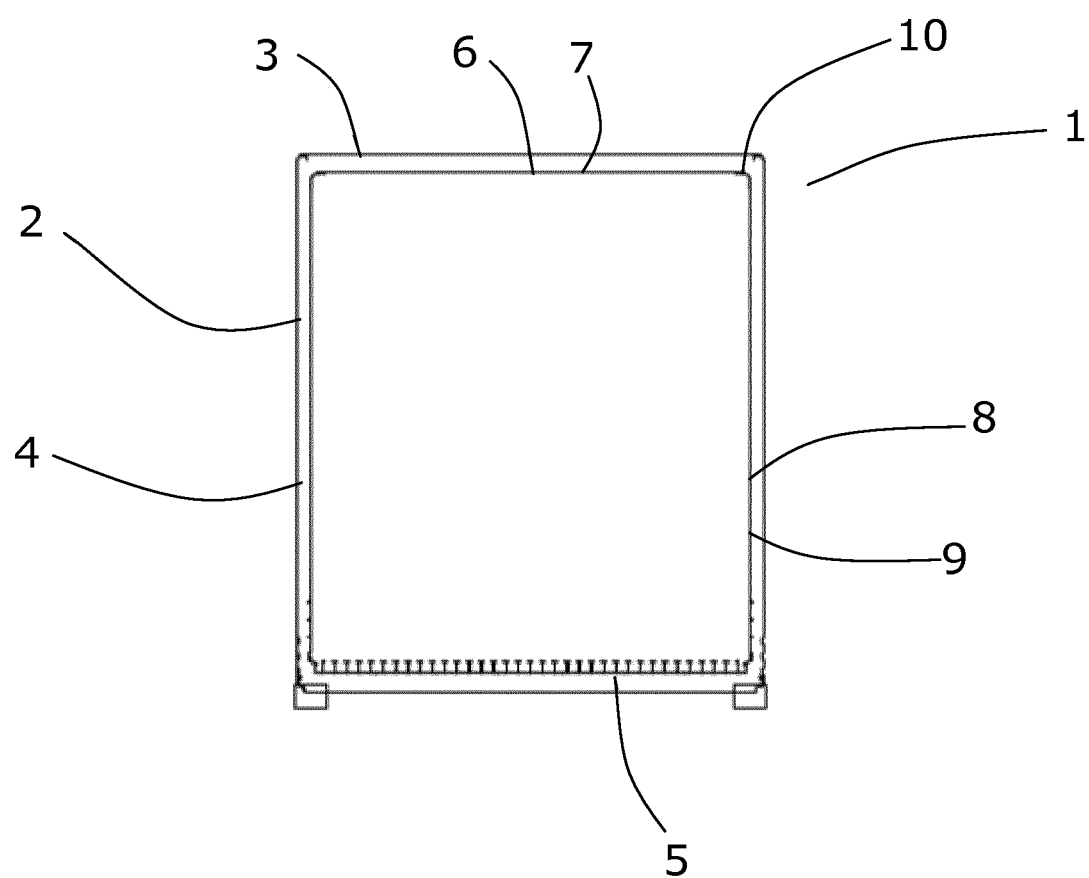
FIG. 1 shows a cargo transportation container with inner walls made of side plates and ceiling made of top plates and the connecting plates.

Now convenient embodiments of the invention will be described.

FIG. 1 shows a cargo transportation container 1 comprising: An outer wall 2, an outer roof 3, an isolation layer 4, a floor 5, a ceiling 6 made of top plates 7, inside walls 8 made of side plates 9, connecting plates 10 to connect the side plates and the top plates.

FIG. 2 shows in an exploded view the joint between the connecting plate 10 and the first plate 11, the first plate can be either a top plate 7 or a side plate 9, an intermediate layer 13 and a welding grid 14. The intermediate layer 13 has two surfaces 18, 19, where one surface 18 is joined with the first plate 11 and the other surface 19 is joined with the connecting plate 10 by the welding grid 14.

FIG. 3 shows the L-shaped connecting plate 10 connecting the first plate 11 and the second plate 12. A second intermediate layer 20 can be placed between the second plate 12 and the connecting plate 10.

FIG. 4 show an alternative embodiment, where the connection plate 10 and the second plate 12 from FIG. 3 are integrated in one plate, the connection plate 10 in FIG. 4.

In the following a joining and a method for joining is described. The first plate 11 is made of metal, the connecting plate 10 is made of a polymer based material and the second plate 12 is also made of a polymer based material.

Joining the first plate 11 with the connecting plate 10 is a combination of several processes. See FIG. 5. First the intermediate layer 13 is fixed to the first plate 11 made of metal. The first plate 11 of metal is heated by using a burner 15 by which the first plate 11 reaches the adhesion temperature. Then a thin band of the intermediate layer 13 is rolled on by a platen roller 16. The heated first plate 11 warms up and partly melts the surface 18 of the intermediate layer 13 creating a bond between the first plate 11 and the surface 18 of the intermediate layer 13. Then the welding grid 14 (FIG. 6) is placed on the connecting plate 10.

Two platen rollers 16 are heated by current, when the rollers press on the welding grid 14, the hot welding grid is pressed into the surface of the connecting plate 10. This allows for easier handling of the combined connecting plate 10 and welding grid 14.

The connection plate 10 with the integrated welding grid 14 is then placed on the first plate 11 with the intermediate layer 13 in such a way that the welding grid 14 now is placed in contact with the second surface 19 of the intermediate layer 13 (FIG. 7). The welding grid 14 is heated by electric current, partially melting the connecting plate 10 and intermediate layer 19, this allows for the two materials to be welded together creating a strong joint. A fixture 17 is used to ease the handling of the parts and to add pressure to the connection plate 10 to keep the partly melted intermediate layer 13 in place.

Alternatively the joining can be made in a simplified process, where the intermediate layer 13 is not heated onto the first plate 11. But the joining to both the first plate 11 and connecting plate 10 is realised with the heating of the welding grid 14.

When adding the intermediate layer 13 to the first plate 11 it is also possible to heat up the intermediate layer 13 before it is added to the metal plate instead of heating up the first plate 11.

Other welding processes like hot air welding or IR welding can also be used to weld the connecting plate 10 and the intermediate layer 13 together but fusion welding is the preferred solution because the welding grid 14 can be accessed from the ends of the container.

The second plate 12 in FIG. 3 is made of a polymer based material just like the connecting plate 10, therefore the second plate 12 and the connection plate 10 can be welded together by placing a welding grid between them and heating the plates by adding current.

In an embodiment the intermediate layer 13 comprises a thermoplastic elastomer material being a TPE-V.

TPE-V is a Thermoplastic Elastomer Vulcanisate. A suitable TPE-V can be a mixture between two products, having a phase comprising a polyolefin such as polypropylene allowing the material to interact with polypropylene, and a phase being a EPDM phase giving sufficient elasticity and further increasing the surface tension.

In a first aspect a cargo transportation container comprising a ceiling and at least two side walls, the ceiling and side walls comprises at least two plates including at least a connecting plate and a first plate, wherein at least one of the first plate 11 or the connecting plate 10 is made of metal, and one of the first plate 11 and the connection plate 10 can be made of polymer based material, the first plate 11 is joined to the connecting plate 10 by a first intermediate layer 13, the first intermediate layer 13 is made of a polymer based material, the first intermediate layer 13 comprises at least two surfaces 18 and 19, where one surface of the first intermediate layer 13 is adhered to a plate, the first plate 11 or the connection plate 10, made of metal and another surface of the first intermediate layer 13 is either adhered to a plate, the first plate 11 or the connection plate 10, made of metal or welded to a plate, the first plate 11 or the connection plate 10, made of polymer based material 10.

A second aspect comprises a cargo transportation container according to the first aspect, wherein the ceiling or a side wall comprises a second plate 12, the second plate 12 is joined to the connecting plate 10.

A third aspect comprises a cargo transportation container according to the second aspect, wherein the first plate 11 is part of one of the side walls 8 of the container and the second plate 12 is part of the ceiling 6 of the container and the connecting plate 10 is connecting first plate 11 and the second plate 12.

A fourth aspect comprises a cargo transportation container according to the second aspect, wherein both the second plate 12 and the connecting plate 10 is made by a polymer based material.

A fifth aspect comprises a cargo transportation container according to the second aspect, wherein at least one of the second plate 12 or the connection plate 10 is made of metal, and one of the second plate 12 and the connection plate 10 can be made of polymer based material the second plate 12 is joined to the connecting plate 10 by a second intermediate layer 20, the second intermediate layer 20 is made of polymer based material, the second intermediate layer 20 comprises at least two surfaces, where one surface of the second intermediate layer 20 is adhered to a plate, the second plate 12 or the connection plate 10, made of metal and another surface of the second intermediate layer 20 is either adhered to a plate, the second plate 12 or the connection plate 10, made of metal or welded to a plate, the second plate 12 or the connection plate 10, made of polymer based material.

A sixth aspect comprises a cargo transportation container according to the second or fifth aspect wherein the polymer based material used for the first intermediate layer 13 and/or the second intermediate layer 20 is a thermoplastic elastomer material.

A seventh aspect comprises a cargo transportation container according to the sixth aspect, wherein the thermoplastic elastomer material is a TPE-V.

An eight aspect comprises a cargo transportation container according to any of the aspects 1 to 7, wherein the polymer based material used for the first plate 11, the second plate 12 or the connecting plate 10 is a thermoplastic elastomer material or a polypropylene thermoplastic.

A ninth aspect comprises a cargo transportation container according to any of the aspects 1 to 7, wherein the metal used for the first plate 11, the second plate 12 or the connecting plate 10 is steel or aluminium.

A tenth aspect comprises a method of assembling a cargo transportation container, the transport container comprises a ceiling and at least two side walls, the ceiling and side walls comprises at least two plates including at least a connecting plate and a first plate, wherein at least one of the first plate 11 or the connection plate 10 is made of metal, and one of the first plate 11 and the connection plate 10 can be made of polymer based material, the first plate 11 is joined to the connecting plate 10 by a first intermediate layer 13, the first intermediate layer 13 is made of a polymer based material, the first intermediate layer 13 comprises at least two surfaces 18, 19, where one surface of the first intermediate layer 13 is adhered to a plate, the first plate 11 or the connection plate 10, made of metal and another surface of the first intermediate layer 13 is either adhered to a plate, the first plate 11 or the connection plate 10, made metal or welded to a plate, the first plate 11 or the connection plate 10, made of polymer based material.

An eleventh aspect comprise a method according to the tenth aspect, wherein at least one of the first plate 11 and the connecting plate 10 is made of metal, and one surface of the first intermediate layer 13 is fixed to the plate made of metal by heating up the metal where the first intermediate layer 13 is to be applied and apply the first intermediate layer 13 to create an adhesive bonding between the plate made of metal and the one surface of the first intermediate layer 13.

A twelfth aspect comprises a method according to the tenth aspect, wherein at least one of the first plates 11 or the connecting plate 10 is made of metal, and one surface of the first intermediate layer 13 is fixed to the plate made of metal by heating up first intermediate layer 13 and apply the first intermediate layer 13 to the plate made of metal to create an adhesive bonding between the plate made of metal and the one surface of the first intermediate layer 13.

A thirteenth aspect comprises a method according to the tenth aspect, wherein either the first plate 11 or the connecting plate 10 is made of polymer based material, and one surface of the first intermediate layer 13 is fixed to the plate made of polymer based material by welding.

A fourteenth aspect comprises a method according to the thirteenth aspect, wherein a welding grid 14 is placed between one surface of the first intermediate layer 13 and the plate made of polymer based material, the plate made of polymer based material is welded to the first intermediate layer 13 by connecting electrical power to the welding grid 14.

A fifteenth aspect comprises a method according to the thirteenth aspect, wherein pressure is applied to the plate made of polymer based material during and/or after welding where the plate is connected to the first intermediate layer 13.

The inventio claimed is:

1. A cargo transportation container comprising:
   a ceiling;
   at least one side wall;
   a connecting plate configured to join an edge region of the at least one side wall with an edge region of the ceiling; and
   an intermediate layer disposed between the connecting plate and the edge region of the at least one side wall and the connecting plate and the edge region of the ceiling, wherein the intermediate layer comprises an adhesive adhered to metal on a first side and a hot melt material welded to a plastic material on an opposite side, wherein the connecting plate is formed from one of: a metal and a plastic material, and the respective edge regions of the at least one side wall and the ceiling are formed from the other material.

2. The cargo transportation container according to claim 1, wherein the intermediate layer comprises a polymer based material.

3. The cargo transportation container according to claim 2, wherein the polymer based material is a thermoplastic elastomer material or a polypropylene thermoplastic.

4. The cargo transportation container according to claim 3, wherein the metal used for the connecting plate is steel or aluminium.

5. The cargo transportation container according to claim 3, further comprising a welding grid disposed between one surface of the intermediate layer and the at least one side wall, ceiling or connecting plate when made of a plastics material, the welding grid being connectable to electrical power for heating up the hot melt material.

6. The cargo transportation container according to claim 2, further comprising a welding grid disposed between one surface of the intermediate layer and the at least one side wall, ceiling or connecting plate when made of a plastics material, the welding grid being connectable to electrical power for heating up the hot melt material.

7. The cargo transportation container according to claim 2, wherein the metal used for the connecting plate is steel or aluminium.

8. The cargo transportation container according to claim 1, wherein the plastic material is PP (polypropylene).

9. The cargo transportation container according to claim 8, wherein the metal used for the connecting plate is steel or aluminium.

10. The cargo transportation container according to claim 8, further comprising a welding grid disposed between one surface of the intermediate layer and the at least one side wall, ceiling or connecting plate when made of a plastics material, the welding grid being connectable to electrical power for heating up the hot melt material.

11. The cargo transportation container according to claim 1, wherein the metal used for the connecting plate is steel or aluminium.

12. A method of assembling a cargo transportation container comprising:
- a ceiling;
- at least one side wall;
- a connecting plate configured to join an edge region of the at least one side wall with an edge region of the ceiling; and
- an intermediate layer disposed between the connecting plate and the edge region of the at least one side wall and the connecting plate and the edge region of the ceiling, wherein the intermediate layer comprises an adhesive adhered to metal on a first side and a hot melt material welded to a plastic material on an opposite side, wherein the connecting plate is formed from one of: a metal and a plastic material, and the respective edge regions of the at least one side wall and the ceiling are formed from the other material,
- wherein the method comprises:
  - i) adhering the first side comprising the adhesive to the at least one side wall and the ceiling being made of metal and welding the other side comprising the hot melt material to the connecting plate being made of a plastic material or
  - ii) adhering the one side comprising the adhesive to the connecting plate being made of metal and welding the other side comprising the hot melt material to the at least one side wall and the ceiling being made of a plastic material.

13. The method of assembling a cargo transportation container according claim 12 when option ii) is implemented, wherein the connecting plate is made of metal, and the first side comprising adhesive of the intermediate layer is fixed to the connecting plate by heating up the metal where the intermediate layer is to be applied and applying the intermediate layer to create an adhesive bonding between the connecting plate made of metal.

14. The method of assembling a cargo transportation container according to claim 13, further comprising:
- placing a welding grid between the hot melt material and the plastic material, and supplying electrical power to the welding grid to thereby melt the hot melt material.

15. The method of assembling a cargo transportation container according to claim 12, wherein a welding grid is placed between the hot melt material and the plastic material, and that the welding to the plastic material is by connecting electrical power to the welding grid.

16. A method of assembling a cargo transportation container comprising:
- a ceiling;
- at least one side wall;
- a connecting plate configured to join an edge region of the at least one side wall with an edge region of said ceiling; and
- an intermediate layer comprising a polymer based material, wherein the intermediate layer is disposed between the connecting plate and the edge region of the at least one side wall and the connecting plate and the edge region of the ceiling, wherein the intermediate layer comprises an adhesive adhered to metal on a first side and a hot melt material welded to a plastic material on an opposite side, wherein the connecting plate is formed from one of: a metal and a plastic material, and the respective edge regions of the at least one side wall and the ceiling are formed from the other material,
- wherein the method comprises:
  - when the connecting plate is made of the plastic material, the method comprises:
    - adhering the first side of the intermediate layer that includes the adhesive to the at least one side wall; and
    - welding the other side of the intermediate layer that includes the hot melt material to the connecting plate; and
  - when the connecting plate is made of metal, the method comprises:
    - adhering the first side of the intermediate layer that includes the adhesive to the connecting plate; and
    - welding the other side of the intermediate layer that includes the hot melt material to the at least one side wall and the ceiling.

17. The method of assembling a cargo transportation container according to claim 16, wherein the polymer based material is a thermoplastic elastomer material or a polypropylene thermoplastic.

18. The method of assembling a cargo transportation container according to claim 16, wherein the cargo transportation container further comprises:
- a welding grid disposed between one surface of the intermediate layer and the at least one side wall, ceiling or connecting plate when made of a plastics material, the welding grid being connectable to electrical power for heating up the hot melt material.

19. A method of assembling a cargo transportation container comprising:
- a ceiling;
- at least one side wall;
- a connecting plate configured to join an edge region of the at least one side wall with an edge region of the ceiling; and
- an intermediate layer disposed between the connecting plate and the edge region of the at least one side wall and the connecting plate and the edge region of the ceiling, wherein the intermediate layer comprises an adhesive adhered to metal on a first side and a hot melt material welded to a plastic material on an opposite side, wherein the connecting plate is formed from one of: a metal and a plastic material that is PP (polypropylene), and the respective edge regions of the at least one side wall and the ceiling are formed from the other material,
- wherein the method comprises:
  - when the connecting plate is made of the plastic material, the method comprises:
    - adhering the first side of the intermediate layer that includes the adhesive to the at least one side wall; and
    - welding the other side of the intermediate layer that includes the hot melt material to the connecting plate; and
  - when the connecting plate is made of metal, the method comprises:
    - adhering the first side of the intermediate layer that includes the adhesive to the connecting plate; and
    - welding the other side of the intermediate layer that includes the hot melt material to the at least one side wall and the ceiling.

20. A method of assembling a cargo transportation container comprising:
- a ceiling;
- at least one side wall;
- a connecting plate configured to join an edge region of the at least one side wall with an edge region of the ceiling; and an intermediate layer disposed between the connecting plate and the edge region of the at least one side wall and the connecting plate and the edge region of the ceiling, wherein the intermediate layer comprises an adhesive adhered to metal on a first side and a hot melt material welded to a plastic material on an opposite side, wherein the connecting plate is formed from one of: a metal that is steel or aluminium and a plastic material, and the respective edge regions of the at least one side wall and the ceiling are formed from the other material, wherein the method comprises:
 when the connecting plate is made of the plastic material, the method comprises:
  adhering the first side of the intermediate layer that includes the adhesive to the at least one side wall; and
  welding the other side of the intermediate layer that includes the hot melt material to the connecting plate; and
 when the connecting plate is made of metal that is steel or aluminum, the method comprises:
  adhering the first side of the intermediate layer that includes the adhesive to the connecting plate; and
  welding the other side of the intermediate layer that includes the hot melt material to the at least one side wall and the ceiling.

\* \* \* \* \*